(12) United States Patent
Bell

(10) Patent No.: US 9,296,404 B1
(45) Date of Patent: Mar. 29, 2016

(54) WHEELBARROW CONVERSION KIT AND CART

(71) Applicant: Interconnect Specialties, Incorporated, Diamond Bar, CA (US)

(72) Inventor: Thomas L. Bell, Diamond Bar, CA (US)

(*) Notice: Subject to any disclaimer, the term of this patent is extended or adjusted under 35 U.S.C. 154(b) by 0 days.

(21) Appl. No.: 14/738,933

(22) Filed: Jun. 15, 2015

(51) Int. Cl.
*B62D 33/00* (2006.01)
*B62B 1/12* (2006.01)
*B62B 1/00* (2006.01)
*B62B 1/16* (2006.01)

(52) U.S. Cl.
CPC . *B62B 1/12* (2013.01); *B62B 1/002* (2013.01); *B62B 1/16* (2013.01)

(58) Field of Classification Search
CPC ............ B62B 1/12; B62B 1/002; B62B 1/16; B62B 1/00; B62B 1/20; B62B 5/06
USPC ...................................................... 280/47.31
See application file for complete search history.

(56) References Cited

U.S. PATENT DOCUMENTS

| | | | | | |
|---|---|---|---|---|---|
| 717,471 | A | * | 12/1902 | Tanner | 280/43 |
| 736,697 | A | * | 8/1903 | Cummins | B62B 1/18 280/43.22 |
| 931,096 | A | * | 8/1909 | Todd | B62B 1/18 280/47.17 |
| 1,622,354 | A | * | 3/1927 | Smith | B62B 1/18 280/47.31 |
| 2,598,261 | A | * | 5/1952 | Hrabal | B62B 1/20 280/47.17 |
| 4,052,079 | A | * | 10/1977 | Lehman | B62B 1/26 280/47.2 |
| 4,767,128 | A | * | 8/1988 | Terhune | B62B 1/18 188/19 |
| 5,031,926 | A | * | 7/1991 | Wannamaker | B62B 1/20 280/47.2 |
| 6,220,622 | B1 | * | 4/2001 | Garcia | B62B 1/20 269/17 |
| 6,241,276 | B1 | * | 6/2001 | Wilburn | B62B 1/20 280/47.18 |
| 6,390,496 | B1 | * | 5/2002 | Eicher | B62B 1/24 280/47.2 |
| 6,508,478 | B1 | * | 1/2003 | Ortez | B62B 1/20 280/47.31 |
| 6,880,852 | B2 | * | 4/2005 | Lim | B62B 5/06 16/426 |
| 7,472,917 | B2 | * | 1/2009 | Loudon | B60D 1/00 280/292 |
| 8,231,132 | B2 | * | 7/2012 | DiLorenzo, Sr. | B62B 3/001 280/47.31 |
| 8,444,166 | B1 | * | 5/2013 | Jarvis | B62B 3/00 280/415.1 |
| 2003/0006570 | A1 | * | 1/2003 | Baker | B62B 1/18 280/47.17 |
| 2003/0015852 | A1 | * | 1/2003 | Swift | B62B 1/18 280/47.34 |
| 2004/0164509 | A1 | * | 8/2004 | Campbell | B62B 1/002 280/47.31 |
| 2005/0212237 | A1 | * | 9/2005 | Lin | B62B 1/002 280/47.31 |
| 2005/0258007 | A1 | * | 11/2005 | Albert | B62B 1/18 188/2 D |
| 2008/0084038 | A1 | * | 4/2008 | Byers | B62B 3/08 280/47.34 |
| 2012/0112426 | A1 | * | 5/2012 | Volkmann | B62B 1/002 280/107 |
| 2013/0001906 | A1 | * | 1/2013 | Richards | B62B 1/18 280/47.31 |

* cited by examiner

*Primary Examiner* — Brodie Follman
*Assistant Examiner* — Brian Cassidy

(57) ABSTRACT

Embodiments of a conversion kit for a wheelbarrow include a wheelbase and a cross handle. The wheelbase has box frame including a pair of wheels pivotably connected to the frame. The wheelbase mounts to the wheelbarrow handles beneath the wheelbarrow tray. The wheels may be separated by a distance greater than the distance between the pair of handles at the back of the tray. The cross handle mounts to and connects the wheelbarrow handles behind the tray back converting the wheelbarrow into an easily handled cart.

19 Claims, 5 Drawing Sheets

WHEELBARROW CONVERSION KIT AND CART

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention is in the field of wheelbarrows and carts. In particular, it concerns apparatus for converting a wheelbarrow into a cart and a cart including such apparatus.

Wheelbarrows are widely used devices for transporting loads, particularly in construction and gardening. A wheelbarrow generally has a front wheel, handles that extend rearward, and legs beneath the handles. In use, the wheelbarrow stands on the front wheel and the legs. To transport a load, a user grasps the pair of handles and lifts so that part of the load is carried by the front wheel and part of load is carried by the user's arms. A moving wheelbarrow relies on the user's balance and strength to support its upright orientation.

The load that a wheelbarrow can accommodate is in part limited by the size of the tray, but it is also limited by the arm strength of the user. Large-tray wheelbarrows find wide use in construction jobs, but home-use wheelbarrows are typically smaller to accommodate occasional users who may lack the strength needed to transport larger loads. Thus there is a need for wheelbarrows that can accommodate large or heavy loads without requiring great strength and exertion by the user. Because wheelbarrows are in common use, there is also a need for a conversion kit to modify a conventional wheelbarrow for use without requiring high exertion.

A wheelbarrow is useful in part because it can be easily steered. Handgrips at the ends of relatively long handles allow a user to apply a long moment arm to alter the course even though the wheel itself is usually on a fixed axis. The single wheel design limits contact with the ground to a small area so that resistance to course change is relatively low. Thus, in order to maintain utility of a wheelbarrow, any cart conversion needs to retain the ability for the user to steer the converted wheelbarrow.

A conventional wheelbarrow has a three-point stance between the front wheel and the pair of rearward mounted legs. Large capacity wheelbarrows are known to tip over, particularly during filling. Thus in order to maintain stability of a wheelbarrow, any cart conversion needs to maintain, and preferably increase, the spacing and stability of supports.

Paired handles are present in conventional wheelbarrows to lift the load for transport. However, such handles are difficult to use in a cart. There is thus a need for a cart including a handle that permits a converted wheelbarrow to be pushed, pulled, or steered.

Others have addressed these problems with only partial success. U.S. Pat. No. 6,880,852 to Lim teaches a wheelbarrow that has both an added handle and added rear wheels. The wheels run on a fixed axle attached to the wheelbarrow legs and thus are not easily steerable. U.S. Pat. No. 6,220,622 to Garcia includes pivoting wheels attached to individual posts depending from the respective handle. U.S. Pat. No. 6,508,478 to Ortez also shows pivoting wheels. Ortez attaches the wheels (and a toolbox) to the existing legs of the wheelbarrow and spaces the wheels wider than the legs. The Ortez toolbox anchors the wheels behind the wheelbarrow legs, thus shifting the load supports away from the filled-tray center of mass. Both Lim and Ortez teach attachment of wheels to wheelbarrow legs, so that the legs remain in place but do not contact the ground. The dangling legs add weight without function and also interfere with the wheel placement so that the modified wheelbarrow necessarily stands higher than the unmodified wheelbarrow, complicating loading and limiting capacity because the top edge of the tray is no longer level when standing on level ground.

BRIEF SUMMARY OF THE INVENTION

In some embodiments, the invention includes a conversion kit for a wheelbarrow. A wheelbarrow includes a wheel, a tray having a flat tray bottom and a tray back, and a pair of handles that support the wheel and extending beneath the tray bottom and beyond the tray back. The kit includes a wheelbase and a cross handle. The wheelbase may include an upper member, a lower member, and two rear wheels, with the lower member connected to and parallel to the upper member. The two rear wheels may be pivotably connected to the lower member.

The wheelbase is configured to mount to the pair of handles beneath the tray bottom. The cross handle is configured to mount to and to connect the pair of handles behind the tray back.

The rear wheels may be separated by a distance greater than the distance between the pair of handles as measured at the back of the tray. The cross handle may include two parallel uprights and a cross member, with each upright attachable to one of the handles, and the cross member connecting the first upright to the second upright so that the cross member bridges between the two handles, when the cross handle is installed to a wheelbarrow. At least one of the wheel may include a brake.

The cross handle may also have handle extensions, with each handle extension disposed between an upright and the cross member. The handle extension may be substantially perpendicular to both the cross member and the respective upright.

The wheelbase may have a front side and a rear side parallel to the front side, with the front side and the rear side each extending between the upper member and the lower member to form a box frame. The rear side is positioned closer to the back of the wheelbarrow tray when the wheelbase is mounted to the pair of handles. The box frame may have a cross sectional shape (if sectioned perpendicular to the rear side) that is substantially square.

The wheelbase is configured to mount to the pair of handles such that the lower member is disposed at an acute angle with respect to the handles. The acute angle is between about 70 degrees and about 90 degrees. The wheelbase may include a brace that connects the lower member to the pair of handles.

In other embodiments, the invention includes a wheeled cart having a front wheel, a tray with a front end, a rear end, and a bottom, with the front end of the tray disposed near the front wheel. The cart also includes a pair of elongated handles and a wheelbase. The handles connect to the front wheel and to the bottom of the tray. The wheelbase may include a box frame connected to the underside of the handles near the tray rear end. The box frame has a pair of wheels and may be disposed at an acute angle with respect to the tray bottom. The acute angle may be about 70 to about 90 degrees.

The cart may also include a cross handle having two parallel uprights and a cross member, with each upright attached to a one of the handles, and the cross member connecting the two uprights. The cart may also include a fastener and a block.

The first fastener may extend through the tray, through one of the pair of handles, and into the box frame, with the block situated between one of the pair of handles and the box frame. The block may include a notch to accommodate the fastener. The cart may also include a U-bolt that extends from the box frame, around the block and the handle, which compresses the block between the box frame and the handle.

The cart may also include a cross brace and a side brace with the cross brace connecting the pair of handles and the side brace extending between the box frame and the cross brace. The side brace may have an adjustable length. In some embodiments, the side brace includes a first sub-brace and a second sub-brace. The first sub-brace connects to the cross brace and the second sub-brace connects to the box frame. The sub-braces may each have multiple piercings with the sub-braces coupled to one another by a fastener passing through one of the piercings on each sub-brace.

The cart may also include a cross handle with first and second parallel uprights and a cross member. Each upright may be attached to one of the handles with the cross member connecting uprights.

In other embodiments, the invention includes a wheelbase that includes an elongated box frame having an upper member and a lower member. The upper member may be separated from the lower member by parallel side members. A pair of wheels may be pivotably mounted to the box frame by fasteners extending through the upper member and the lower member. The upper member may include a slot parallel to the axis of the box frame and a pair of holes parallel to the slot. A rectangular U-bolt may be disposed in the pair of holes. The wheelbase may also include an adjustable-length side brace connected to the lower member.

BRIEF DESCRIPTION OF THE DRAWING(S)

DETAILED DESCRIPTION OF THE INVENTION

The kit of the invention is intended to be mounted to some parts of a conventional wheelbarrow. Once the kit is properly installed, the wheelbarrow may still be used as a wheelbarrow, or it may be used as a cart. Thus the converted wheelbarrow has the benefits of each: like a wheelbarrow, it may be lifted by the handles to transport a load along a narrow path and tipped at the destination to deliver contents. Like a cart, it may be pushed or pulled by the cross handle without reliance on high user arm strength or balance. When used as a cart, the converted wheelbarrow may be easily steered and remain stably upright even in motion. It may be pushed in the same direction as an unconverted wheelbarrow, or it may be pulled in the opposite direction.

In the description that follows, unless otherwise noted, directions refer to those of an upright wheelbarrow or converted wheelbarrow standing on level ground. Up, upwards, above, and similar words refer to the direction towards the open concave surface of the tray. Down, downwards, below, and similar words are towards the ground, away from the tray. Rear, rearwards, back, backwards, behind, and similar words refer to direction towards the end of the wheelbarrow having the handle handgrips. Front, frontwards, forward, ahead, and similar words refer to the direction towards the opposite end of the wheelbarrow away from the handle handgrips. Lateral is away from the front-to-back (vertically oriented, passing between the handles) mid-plane of the wheelbarrow and medial is toward that mid-plane.

Figure 1:
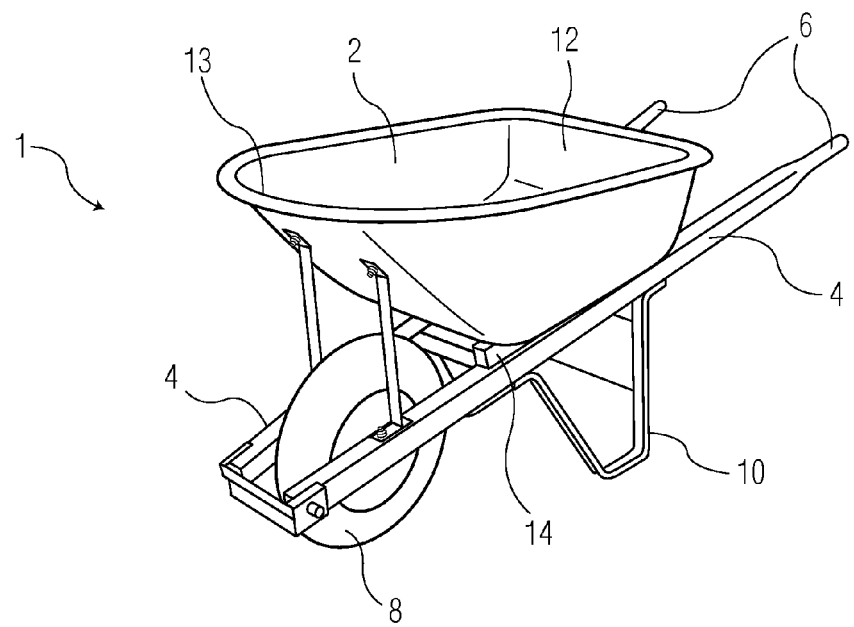
FIG. 1 is a perspective view of a conventional one-wheel wheelbarrow.

Referring to FIG. 1, a prior art wheelbarrow 1 includes a concave tray 2 mounted to a pair of handles 4. The handles 4 extend from near the front of tray 2 to beyond the rear of tray 2 where they terminate in hand grips 6. In most wheelbarrows, handles 4 also support a front wheel 8 and a pair of legs 10. Legs 10 support wheelbarrow 1 when being filled or stored.

Figure 2:
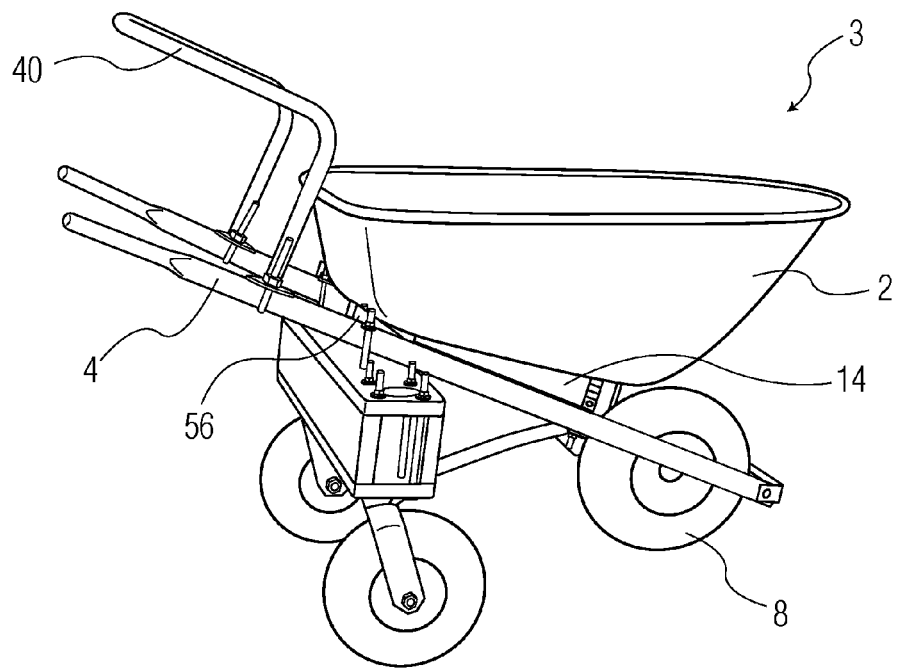
FIG. 2 is a side perspective view of a first embodiment of the kit of the invention assembled to a conventional wheelbarrow.

There are several common variations in wheelbarrow design (not illustrated, but well known in the art) that may also be suitable for use with the invention. For example, there may be a pair of front wheels, or legs 10 or front wheel 8 may be attached directly to tray 2 rather than to handles 4. One or more wedges 14 between handles 4 and tray 2 may serve to change the angle of tray 2 with respect to handles 4. Wedges 14 may be in any of several positions (compare wedge 14 of FIG. 1 to wedge 14 of FIG. 2). Handles 4 generally diverge, being close to one another near front wheel 8 and more widely separated near hand grips 6. There may be one or more front struts connecting tray 2 to handles 4 near wheel 8 (unlabeled, but visible in FIG. 1).

Tray 2 typically includes a steeply sloping rear end 12 and a more gently sloping front end 13 to aid in dumping of contents. Most wheelbarrow trays include two pairs of holes through which fasteners connect tray 2 to handles 4. Generally one pair of holes is nearer front end 13 and one pair nearer rear end 12. In some wheelbarrow designs, a single set of fasteners pass through these holes to connect both legs 10 and handles 4 to tray 2. In other designs, there may be separate fasteners that connect legs 10 to handles 4 or to tray 2.

Figure 7A:
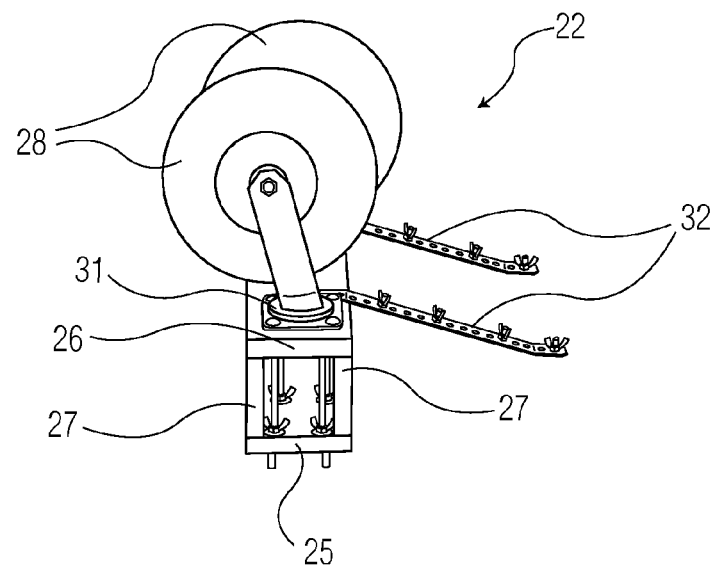
FIG. 7A is a top perspective view of an embodiment of the wheelbase portion of the invention shown inverted from in-use orientation.
Figure 7B:
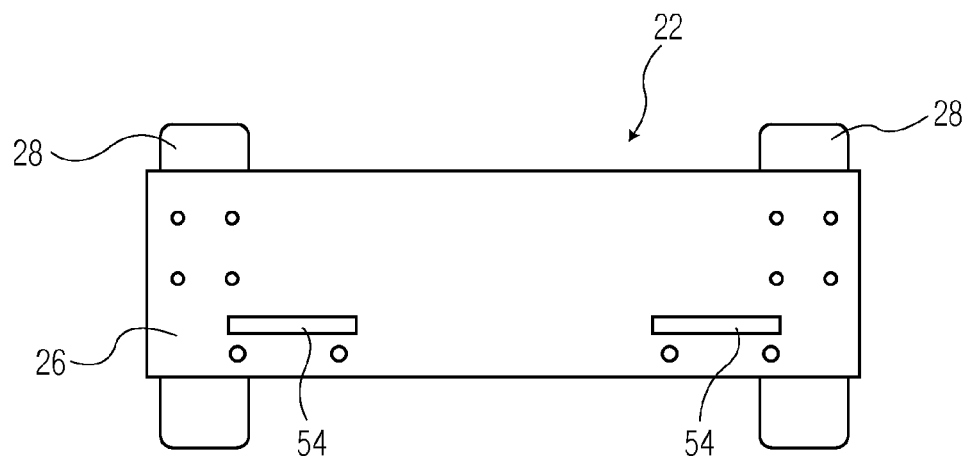
FIG. 7B is a top view of the wheelbase of FIG. 7A.
Figure 8:
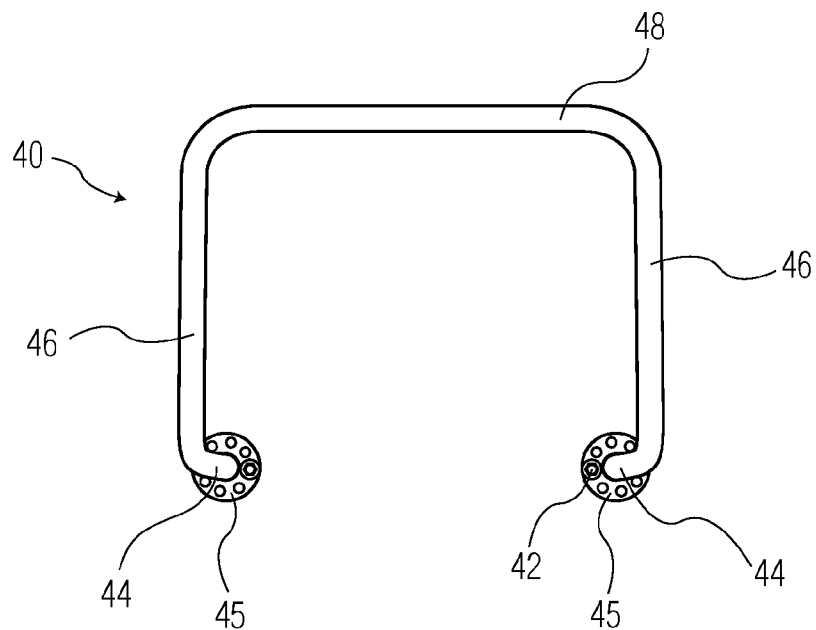
FIG. 8 is a top perspective view of an embodiment of the cross handle portion of the invention.
Figure 9:
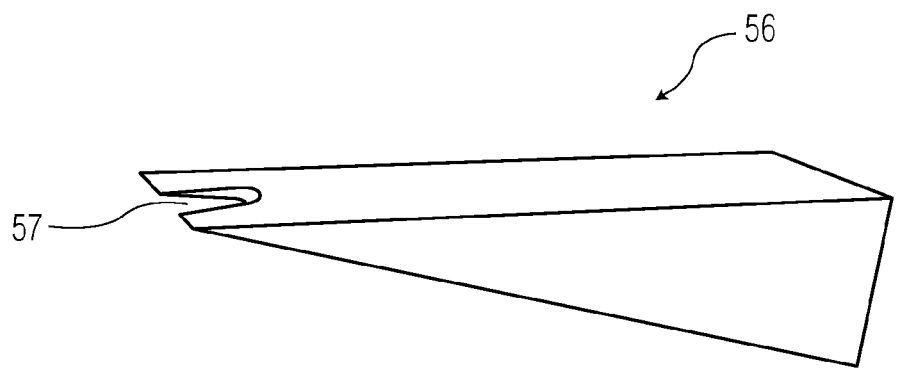
FIG. 9 is a perspective view of a detail of block that is part of an embodiment of the invention.

FIGS. 2 through 6 show various views of embodiments of converted wheelbarrow 3 of the invention modified with parts from the kit of the invention, where like parts have common item numbers. These figures also share item numbers with like or similar parts from a prior art wheelbarrow as illustrated in FIG. 1. FIGS. 7 through 9 show parts of the kit of the invention.

In some embodiments, the conversion kit of the invention may include several parts. These parts may be packaged together with instructions for converting a wheelbarrow to a steerable cart. The conversion kit may includes wheelbase 22, cross handle 40, and assorted fasteners that secure wheelbase 22 and cross handle 40 to wheelbarrow handles 4. In some embodiments, some parts may be broken down further for ease of packing and transport. In other embodiments, conversion kit of the invention includes only the wheelbase 22 and appropriate fasteners.

Wheelbase 22 attaches to the wheelbarrow underneath tray 2, close to the rear of tray 2 and largely in the position formerly occupied by legs 10. Wheels 28 on wheelbase 22 hold converted wheelbarrow 3 upright when at rest, as legs 10 do in a conventional wheelbarrow, but wheels 28 also serve to stably support converted wheelbarrow 3 during motion. Wheelbase 22 may be attached to tray 2, to handles 4, or to both. Wheelbase 22 bridges handle 4 and connects to each handle 4 behind tray 2. In some embodiments, wheelbase 22 also bolts through handles 4 to tray 2.

Figure 3:
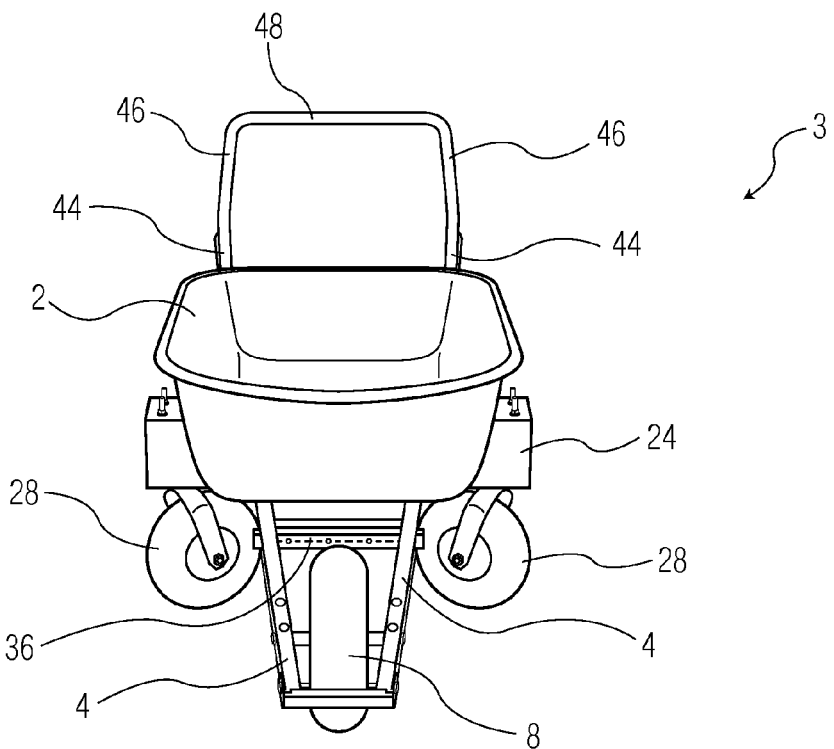
FIG. 3 is a front view of the embodiment of FIG. 2.
Figure 4:
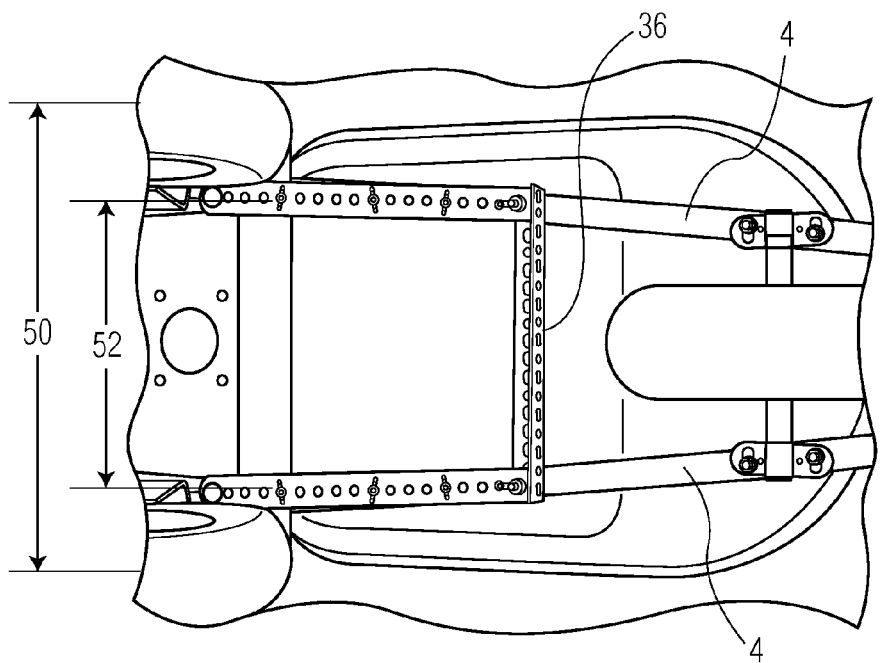
FIG. 4 is a partial bottom perspective view of the embodiment.
Figure 5:
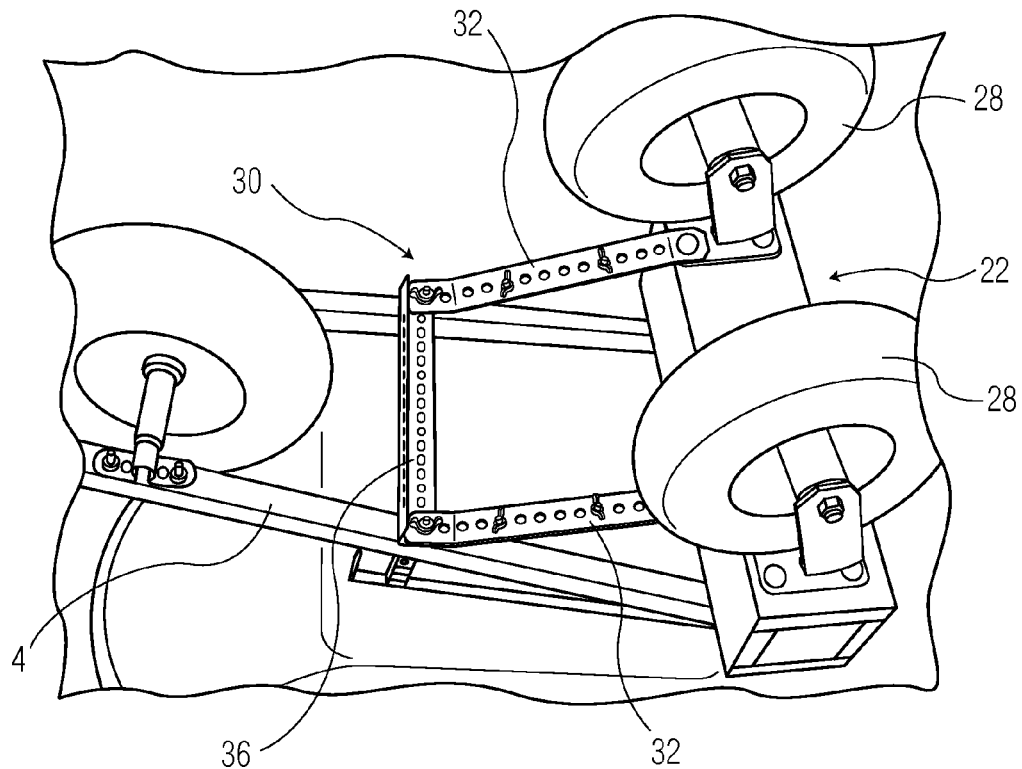
FIG. 5 is a second partial bottom perspective view of the embodiment.
Figure 6:
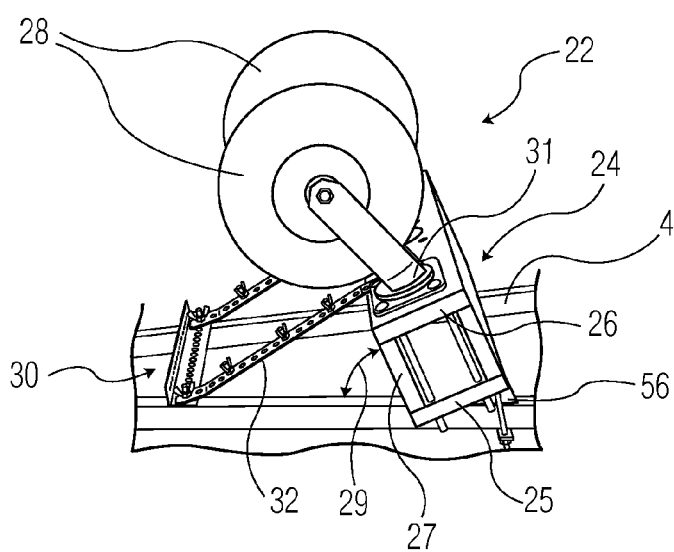
FIG. 6 is a partial side perspective view of the embodiment, shown with the tray down.

Wheelbase 22 includes a frame 24, a pair of wheels 28 attached to the frame, and in some embodiments, a support brace 30 that provides additional support to wheelbase 22 when mounted. As best seen in FIGS. 3 and 4, the distance between wheel centers 50 may be greater than the distance between handles at the front to back location of wheel centers 52. This improves stability and helps prevent the converted wheelbarrow from falling, when, for example, materials thrown into the tray impact the tray side. The wide wheel base also helps maintain stability during transport on non-level surfaces. The wide wheelbase also prevents interference between tray 2 or handles 4 to fasteners holding wheels 28 to frame 24.

Frame 24 includes upper member 25, lower member 26, and one or more side members 27. Upper member 25 and lower member 26 are substantially parallel to one another. Upper member 25 connects to lower member 26 through one or more side members 27. In some embodiments, two substantially parallel side members 26 connect upper member 25 to lower member 26 forming a box frame that provides rigidity and strength to the assembly. The open box shape also permits easy access to install fasteners during assembly. Frame 24 may be substantially square in cross section and is elongated so that it may span the distance between handles 4. Frame 24 may have length of between two and four times its width and may extend beyond the span of handles 4 to support the wider wheelbase as discussed above.

A pair of wheels 28 attaches to lower member 26 of frame 24 and provide both support for the converted wheelbarrow while at rest and allow rolling during transport. Wheels 28 may be attached to frame 24 by conventional threaded fasteners. These fasteners may penetrate entirely through frame 24 for easier access and to provide additional strength. When assembled in converted wheelbarrow 3, wheels 28 may support tray 4 at the same height and angle as legs 10 had supported tray 4 in the unconverted wheelbarrow. This advantageously retains the angle and height of the tray for easier loading and transport.

Wheels 28 pivotably mount to frame 24 to facilitate steering of the converted wheelbarrow. Pivoting mounts 31 may be horizontally disposed (with respect to frame 24) bearings supporting "C"-shaped brackets connecting to either side of each wheel's axis. Pivoting mounts 31 may attach directly to lower member 26 using bolts that extend through holes in lower member 26. These bolts may further extend through frame 24 to corresponding holes in upper member 25. The bolts may be fastened by nuts above upper member 25 and may be further fastened with additional nuts internal to frame 24. The bolts traversing frame 25 aid in rigid and secure mounting of wheels 28 to frame 24.

Wheelbase 22 including frame 24, wheels 28, and in some embodiments, support brace 30 has a distinctive appearance. This is ornamental rather than merely utilitarian and includes distinctive features such as the square cross section, the spaced wheels, the open sides of wheelbase 22 having a clear sight line side-to-side through wheelbase 22, and, in some embodiments, the attached support brace 30. Applicant believes the appearance of wheelbase 22 provides advantages in the marketplace that may affect purchasing decisions.

Either or both of wheels 28 may include a brake which prevents the rotation of the wheel and thereby prevents the converted wheelbarrow from rolling away if placed on a slope. Wheels with integral brakes are well known in the art, such as part number 10PPNTSB sold by Access Casters Inc. of Chicago Ill. Such wheels may include a lever aligned with the axis of the wheel. Pressure applied by a user's foot on one side of the lever locks rotation; pressure applied to the other side of the lever releases the lock. In some embodiments, converted wheelbarrow 3 includes a prominent printed warning, such as on a decal applicable to tray 2, to set the wheel brake before leaving the converted wheelbarrow unattended.

Either or both of wheels 28 may also include a swivel lock to lock the wheel in fixed orientation. Locking the orientation of one or both of wheels 28 may direct motion of the converted wheelbarrow in a fixed direction, where desired. Wheels with swivel locks are well known in the art, are commercially available, and will not be further described.

Frame 24 includes several piercings to accommodate bolts and other fasteners. Lower member 26 may be pierced to align with the mounting holes of wheels 28. Upper member 25 may also be pierced by holes aligning with mounting holes of wheels 28 in lower member 26. In some embodiments, upper member 25 also includes a pair of collinear slots 54, each about two inches in length. Slots 54 are spaced so that the distance between their midpoints approximates the spacing of handles 4. The length of slots 54 permits easy assembly and allows fitting to wheelbarrows having handles 4 of different spacing. Upper member 25 may also include two sets of paired holes to accommodate two rectangular U-bolts. Each pair of hole may be disposed adjacent to and rearward of one of slots 54 with the holes separated in the direction parallel to the length of slot 54. A rectangular U-bolt may be installed in each pair of holes with its free ends projecting upward through the holes.

Wheelbase 22 may be spaced from and mounted to handles 4 using a pair of wedge-shaped blocks 56 (best visible in FIG. 9). Blocks 56 may be of any strong material such as dense wood, metal, or reinforced plastic. Each of blocks 56 may be formed as right triangular prisms with height about the width of one of handles 4 and hypotenuse about the width of upper member 25. When installed with hypotenuse in contact with upper member 25 and longer opposing side in contact with handles 4, blocks 56 orients frame 24 so that the angle 29 between side member 27 and handles 4 is between about 70 and about 90 degrees. In some embodiments, angle 29 may be between about 70 and about 85 degrees to more precisely control the height of wheelbase 22. This helps to firmly secure frame 24 to the wheelbarrow and positions wheels 28 at a useful standing height while ensuring ease of steering. Each of blocks 56 may include a notch 57 that extends from the end of block 56 having the smaller included angle and parallel to the sides of block 56. Notch 57 is sized to pass a bolt that extends through tray 2, through one of handles 4, and through one of slots 54 of upper member 25.

Support brace 30 may include a pair of side braces 32 and, in some embodiments, a cross piece 36. Each of side braces 32 extend from the lower aspect of wheelbase 22 for connection to one of handles 4 closer to the front of the wheelbarrow. When installed in converted wheelbarrow 3, side braces generally underlay handles 4 (best visible in FIG. 4). Side braces 32 may be separated from one another at the points of attachment to wheelbase 22 by about the same distance as handles 4 have at that point when installed. In some embodiments, each of side braces 32 may share fasteners connecting respective wheels 28 to wheelbase 22. Each installed side brace 32 forms a roughly triangular structure together with a portion of side member 27 of wheelbase 22 and a portion of one of handles 4. Side braces 32 may be formed of a material such as steel sheet. Side braces 32 may be pierced at multiple positions to adapt to different size wheelbarrows. In some embodiments, side braces 32 may each be formed of two or more sub-braces that linearly overlap each other. The sub-braces may be arranged with any of several amounts of overlap and connected with fasteners such as screws or bolts, so that the effective length of side braces 32 may be adjusted to adapt to different sized wheelbarrows. The separate sub-braces also assist in installation of the completed side brace 32 by independently coupling the forward sub-brace to cross piece 36 and the rear sub-brace to wheelbase 22, then coupling the free ends of the sub-braces. In other embodiments, side braces 32 may be integrated with cross piece 36 into a single-piece support.

Cross piece 36 spans between side braces 32 to provide additional strength and support. Cross piece 36 may be formed of a section of pierced angle iron. The angle adds strength and the piercings allow selection of a set of fastening holes that match the span of separation of handles 4. In some embodiments, cross piece 36 may be cut to length before installation. Alternatively, cross piece 36 may be formed of two or more overlapping sub-pieces so that cross piece 36 may be adjusted in a similar manner to that described for side braces 32.

In some embodiments, support brace 30 may be preassembled to other components of wheelbase 22. In other embodiments, support brace 30 may be not be preassembled to wheelbase 22 to simplify packaging. The user may assemble these components to wheelbase 22 or may first assemble cross piece 36 to wheelbarrow handles 4.

Cross handle 40 attaches to wheelbarrow handles 4, bridging them and forming a more generally useful handle for converted wheelbarrow 3. Cross handle 40 may be attached to handles 4 behind tray 2. In some embodiments, cross handle 40 attaches to handles 4 a few inches behind tray 2, such as two to six inches behind tray 2. The position of attachment of cross handle 40 to handles 4 may be adjusted during assembly to fit an individual wheelbarrow or an individual user.

Cross handle 40 includes fasteners 42, paired uprights 44, paired handle extensions 46, and cross member 48. Uprights 44, handle extensions 46, and cross member 48 may be formed of a single piece of material, which may advantageously be steel tube stock of a size to permit an easy handgrip, such as between about 0.75 inches and about 1.5 inches in diameter.

Uprights 44 each have an end that connects to the respective handle extension 46 and a free end. The free ends of each upright 44 attaches to one of handles 4 so that upright 44 extends upwards from handle 4. Uprights 44 connect to handles 4 via fasteners 42. In some embodiments, each upright 44 ends in a flange 45 that is pierced to accommodate a rectangular "U-bolt" fastener. The fastener accommodates one of handles 4 between the center section of the U-bolt and the flange 45. The threaded side segments of the U bolt extend on the sides of one of handles 4 and through the piercings on flange 45. Applying and tightening nuts to the side segment of the U-bolt on the opposite side of flange 45 to handle 4 attaches each upright 44, and hence cross handle 40, to converted wheelbarrow 3 at handles 4.

Uprights 44 extend between about 10 inches and about 24 inches before connecting or transitioning to handle extensions 46. Each handle extensions 46 extends about perpendicularly to its respective upright 44, so that, when cross handle 40 is installed to handles 4, uprights 44 extend upward from handles 4 and handle extensions 46 extend rearward.

Handle extensions 46 extend rearward from uprights 44 from about 10 inches to about 30 inches. In some embodiments, a rearward extension of about 18 inches places the gripping surface of cross member 48 in a comfortable position for either pushing or pulling the converted wheelbarrow. Cross member 48 extends about perpendicularly from the ends of handle extensions 46 that are opposite to uprights 44. Cross member 48 connects handle extensions 46 completing cross handle 40 by providing a gripping surface that spans between handles 4, but at a height that is comfortably above handles 4 for easy control of the converted wheelbarrow. Cross member 48 may optionally include a contoured or cushioned surface (not shown).

The various parts of the kit of the invention may be assembled to the wheelbarrow using common assembly techniques, such as the use of threaded fasteners. In some embodiments, a user first removes legs 10 of a wheelbarrow. Legs 10 are typically attached to handles 4 or to tray 2 or both using threaded fasteners such as carriage bolts. These fasteners may extend through wedge 14 (if present) and into tray 2 through the holes. User removes these using a wrench or other suitable tool. These steps are most easily accomplished with the wheelbarrow upside down.

The kit is generally sized to match the dimensions of popular wheelbarrows. Some parts, such as side braces 32 may be of adjustable size. However wheelbarrows vary substantially so the kit may be offered in more than one size to better fit the different sizes of wheelbarrows. In some embodiments, wheelbase 22 may be about 22 inches across (in the wheelbarrow side-to-side direction when installed). In other embodiments, wheelbase 22 may be about 31 inches across.

After removal of legs 10, user reassembles handles 4 to tray 2 and, depending on the wheelbarrow design, through wedge 14 and tray 2 using the fastener holes in tray 2. The fasteners may be temporarily retained (as with tape) to prevent their falling out during subsequent assembly. The user may then install cross piece 36 and (optionally) forward sub-brace of side braces 32 to wheelbarrow handles 4 by aligning the holes in cross piece 36 and respective sub-braces with fasteners projecting through the forward set of holes in tray 2. User then attaches wheelbase 22 to the underside of handles 4 by aligning slots 54 of upper member 25 over the fasteners projecting through the rear set of holes in tray 2 and installing nuts (such as wingnuts or standard nuts) to the fasteners inside frame 24. User then slides one of block 56 between each handle 4 and upper member 25 so that notch 57 fits around the fasteners projecting through the rear set of holes in tray 2. This establishes the proper orientation of wheelbase 22 to handles 4. User may then further secure wheelbase 22 in place by aligning rectangular U-bolts disposed in upper member 25 so that one leg of each U-bolt passes over either side of respective block 56 and handle 4. User installs the U-bolt by placing a strap between free ends of each U-bolt and places a nut on each free end.

User may then complete wheelbase 22 installation by assembling side braces 32. As discussed above, forward sub-braces of side braces 32 may already be attached to cross piece 36. Rear sub-braces of side braces 32 may be connected to (or may be preassembled to) lower member 26. User connects the respective sub-braces to one another with additional fasteners, spacing the sub-braces as appropriate for the size of the wheelbarrow. Alternatively, user may assemble the length-adjusted side braces 32 by fastening one end to cross piece 36 and the other end to lower member 26. Once all the parts are properly positioned, user may then tighten all fasteners.

User then completes assembly by standing the converted wheelbarrow upright and attaching cross handle 40 using the U-bolts as described above.

Any of the fasteners discussed may further include washers to spread forces or lock washers to prevent loosening of connections.

This specification discloses various aspects of the invention with reference to particular embodiments, but it should be understood that any of the features, functions, materials, or characteristics may be combined with any other of the described features, functions, materials, or characteristics. The description of particular features, functions, materials, or characteristics in connection with a particular embodiment is exemplary only; it should be understood that it is within the knowledge of one skilled in the art to include such feature, structure, or characteristic in connection with other embodiments whether or not explicitly described. I intend the scope of the appended claims to encompass such alternative embodiments. Variations on these described embodiments will become apparent to those of ordinary skill in the art upon reading the description. The inventor expects skilled artisans to employ such variations as appropriate, and the inventors intend for the invention to be practiced otherwise than specifically described herein. Accordingly, this specification and claims include all modifications and equivalents of the subject matter recited in the claims appended hereto as permitted by applicable law.

Unless otherwise indicated, all numbers used in the specification and claims are to be understood as being modified in all instances by the term "about." Unless indicated to the contrary, the numerical values in the specification and attached claims are approximations that may vary depending upon the desired properties sought to be obtained.

The terms "a," "an," "the" and similar referents used in the context of describing the invention (especially in the context of the following claims) are intended to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the claims. No language in the specification should be construed as indicating any non-claimed element essential to the practice of the invention.

I claim:

1. A conversion kit for a wheelbarrow that includes a wheel, a tray having a flat tray bottom and a tray back, and a pair of handles supporting the wheel and extending beneath the tray bottom and beyond the tray back, the kit comprising:
    a wheelbase including:
        an upper member, a lower member, and two rear wheels, the lower member connected to and parallel to the upper member, and the two rear wheels pivotably connected to the lower member; and
    a cross handle,
    wherein the wheelbase is configured to mount to the pair of handles beneath the tray bottom and the cross handle is configured to mount to and to connect the pair of handles behind the tray back, and wherein the wheelbase further includes a front side and a rear side parallel to the front side, the front side and the rear side each extending between the upper member and the lower member to form a box frame, the rear side disposed near the tray back when the wheelbase is mounted to the pair of handles.

2. The kit of claim 1, wherein the rear wheels are separated by a distance greater than the distance between the pair of handles at the tray back.

3. The kit of claim 1, wherein the cross handle includes first and second parallel uprights and a cross member, each upright attachable to respective one of the pair of handles, and the cross member connecting the first upright to the second upright.

4. The kit of claim 3, wherein the cross handle further includes a first and a second handle extension, each handle extension disposed between the respective upright and the cross member, each handle extension substantially perpendicular to both the cross member and the respective upright.

5. The kit of claim 1, wherein the box frame has a cross sectional shape perpendicular to the rear side that is substantially square and wherein at least one of the wheel includes a brake.

6. The kit of claim 1, wherein the wheelbase is configured to mount to the pair of handles such that the lower member is disposed at an acute angle with respect to the pair of handles.

7. The kit of claim 6, wherein the acute angle is between 70 degrees and 90 degrees.

8. The cart of claim 1, wherein the upper member includes a slot, and wherein the cart further comprises a fastener and a block, the fastener extending through the tray, through one of the pair of handles, and through the slot, the block disposed between one of the pair of handles and the box frame, the block including a notch to accommodate the first fastener.

9. The kit of claim 1, wherein the kit further comprises a brace configured to connect the lower member to the pair of handles.

10. A conversion kit for a wheelbarrow comprising:
    a wheelbase including:
        a elongated box frame having an upper member and a lower member, the upper member separated from the lower member by parallel side members; and
        a pair of wheels pivotably mounted to the box frame,
    wherein the wheels mount to the box frame by fasteners extending through the upper member and the lower member, wherein the upper member includes a slot oriented parallel to the axis of the box frame, and wherein the upper member includes a pair of holes parallel to the slot and a rectangular U-bolt disposed in the pair of holes.

11. The conversion kit of claim 10 further comprising an adjustable-length side brace connected to the lower member.

12. A wheeled cart comprising:
    a front wheel;
    a tray with a front end, a rear end, and a bottom, the front end disposed proximate the front wheel;
    a pair of elongated handles connected to the front wheel and to the tray and disposed beneath the tray bottom; and
    the conversion kit of claim 10,
    wherein the box frame is disposed at an acute angle with respect to the elongated handles.

13. The cart of claim 12, wherein the acute angle is 70 to 85 degrees.

14. The cart of claim 13, further comprising a first fastener and a block, the first fastener extending through the tray, through one of the pair of handles, and into the box frame, the block disposed between one of the pair of handles and the box frame, the block including a notch to accommodate the first fastener.

15. The cart of claim 14, wherein the U-bolt extends from the box frame and around the block and the one of the pair of handles, compressing the block between the box frame and the one of the pair handles.

16. The cart of claim 15, further comprising a cross brace and a side brace, the cross brace connecting the pair of handles and the side brace extending between the box frame and the cross brace.

17. The cart of claim 16, wherein the side brace has adjustable length.

18. The cart of claim 17, wherein the side brace includes a first sub-brace and a second sub-brace, the first sub-brace connected to the cross brace and the second sub-brace connected to the box frame, the first sub-brace having a first plurality of piercings and the second sub-brace having a second plurality of piercings, the first sub-brace coupled to the second sub-brace by a second fastener passing through one of the first plurality of piercings and one of the second plurality of piercings.

19. The cart of claim 18, further comprising a cross handle including first and second parallel uprights and a cross member, each upright attached to a respective one of the pair of handles, and the cross member connecting the first upright to the second upright.

* * * * *